United States Patent [19]

Wiegand et al.

[11] 3,774,180

[45] Nov. 20, 1973

[54] FERROMAGNETIC MEMORY READOUT DEVICE

[76] Inventor: John R. Wiegand, 882 Balfour St., Valley Stream, N.Y. 11580

[22] Filed: July 22, 1971

[21] Appl. No.: 173,708

[52] U.S. Cl. .................... 340/174 SR, 340/174 QB
[51] Int. Cl. .................... G11b5/62
[58] Field of Search .................... 235/61.11 D; 340/174.1 F, 174 AG, 174 MC, 174 SR; 179/100.2 CH; 324/43

[56] References Cited

UNITED STATES PATENTS

| | | | |
|---|---|---|---|
| 2,961,649 | 11/1960 | Eldredge et al. | 235/61.11 D |
| 3,626,160 | 12/1971 | Hagopian | 235/61.11 D |
| 3,210,527 | 10/1965 | Daykin | 235/61.11 D |
| 3,358,124 | 12/1967 | Smith et al. | 235/61.11 D |

*Primary Examiner*—Maynard R. Wilbur
*Assistant Examiner*—Joseph M. Thesz, Jr.
*Attorney*—Lloyd McAulay

[57] ABSTRACT

A readout device for decoding the binary value stored in a ferromagnetic wire where the direction of propagation of a nucleated magnetic domain wall is indicative of the binary value stored in the memory. The readout device includes a magnetic source for nucleating a magnetic domain wall at one end of the wire and propagating it to the other end, and a pickup device with a split head arrangement for detecting the direction of propagation.

The aforementioned Abstract is neither intended to define the invention of the application which, of course, is measured by the claims, nor is it intended to be limiting as to the scope of the invention in any way.

19 Claims, 8 Drawing Figures

INVENTORS.
JOHN R. WIEGAND
MILTON VELINSKY
BY
Leonard H. King
ATTORNEY

INVENTORS.
JOHN R. WIEGAND
BY MILTON VELINSKY
Leonard H. King
ATTORNEY

FERROMAGNETIC MEMORY READOUT DEVICE

This invention relates to a ferromagnetic memory readout device and more particularly to a method and apparatus for reading out a binary number stored in a nucleating ferromagnetic wire.

BACKGROUND OF THE INVENTION

In our copending application Ser. No. 173,706 filed concurrently herewith, entitled FERROMAGNETIC STORAGE MEDIUM, there is described a memory composed of a plurality of ferromagnetic wires each requiring a greater magnetic force for nucleating a magnetic domain wall than is required for propagating the domain wall along the wires. Each wire is modified so that one end is more affected by an external magnetic field. The modification is achieved by making one end thereof of lower reluctance such that the nucleating force required at the end of lower reluctance is less than the nucleating force required by the rest of the wire, but greater than the propagating force of the entire wire. Alternately, one end of the wire may be shortened so that the opposite end will receive a greater magnetic force. When a sufficient magnetic force is brought near the wires, a magnetic domain wall will nucleate at the end more affected by the force and will propagate along the wire to the opposite end. Since there are two opposing directions of propagation, each wire can be used as a binary storage element wherein the direction of propagation determines the binary value. The direction of propagation is fixed in each wire by selecting which end of the wire will have a lower reluctance or which end is shortened. Thus, for example, if the direction of propagation from right to left is representative of a binary "one," lowering the reluctance or shortening at the right end of the wire stores in the wire a one. Similarly, if the direction of propagation from left to right represents a binary zero, then lowering the reluctance or shortening at the left end stores a binary "zero."

BRIEF DESCRIPTION OF THE INVENTION

The present invention describes a readout device for such a ferromagnetic memory. The readout device contains two magnetic sources producing magnetic flux in opposing directions to each other, and an inductive pickup device with a split pickup head arrangement. As each of the ferromagnetic wires of the memory pass the first magnetic source, all previous memory of the wire is erased and the wire is magnetized in a first direction. As it moves out of the field of the first magnetic source, a point of zero magnetism is reached and the wire passes into the opposite magnetic field from the second magnetic source.

Residual magnetism from the first magnetization will oppose the new field until sufficient magnetic force from the second source causes a nucleation to take place at the easily affected end. The magnetic domain wall formed at that end will propagate along the length of the wire to the opposite end causing the wire to be magnetized in the opposite direction. The direction of propagation from left to right or right to left is sensed by the split pickup head which decodes the two possible directions of travel as a binary 0 or a binary 1 in accordance with the pre-established code.

Another embodiment of this invention provides a readout for the self-nucleating ferromagnetic wire as the memory device, wherein the wire has a relatively "soft" core portion and an outer relatively "hard" magnetized shell portion with relatively low and high retentivity, respectively. In this embodiment only one magnetic source is used in the readout device to nucleate a pulse from the easily affected end to the opposite end. A pickup head detects the direction of propagation, as before. After the memory has moved through the readout device, the self-nucleating ferromagnetic wires set the core portion to its initial condition.

The magnetic storage medium in conjunction with the readout device of this invention has application in credit card systems wherein the ferromagnetic wires are imbedded within a credit card and store an identification number. The readout devices could easily be located in department stores and the cards inserted into the devices where the number would be read. The decoded number could then be stored or transmitted to a central computer for authenticating the number.

Other uses for the readout device include security monitory systems wherein the ferromagnetic wires would be used on identification badges to store the employee number. The badges would be inserted into the readout device for decoding and checking.

The readout device could also be formed into a probe unit which could be passed over the ferromagnetic wires storing a number. For example, in inventory checking, each stock item could have a card containing the wires pasted onto it wherein the wires store the stock identifying number. The probe would be passed over the wires and would decode the number. The probe could be connected to a recording unit Accordingly, it is an object of this invention to provide a readout device for a ferromagnetic storage memory.

A further object of the invention is to provide a readout device capable of reading the binary values contained in a magnetic memory consisting of a plurality of ferromagnetic wires capable of nucleating a pulse at one of its ends and propagating the pulse to the opposite end of the wire.

A further object of the invention is to provide a readout device including two magnetic sources each producing a magnetic force in opposing direction to the other, and further including an inductive pickup head capable of detecting the direction in which a pulse passes across the pickup head.

A still further object of the invention is to provide a magnetic readout device connected to logic circuitry for reading the digital values on a magnetic card and for decoding the digital value encoded on the card.

Another object of the invention is to provide a readout device having one magnetic source and a pickup head for use with a self-nucleating ferromagnetic wire.

Yet another object of the invention is to provide a readout device in the form of a card reader for decoding binary values stored on a magnetic memory comprising ferromagnetic wires.

A further object of the invention is to provide a readout device in the form of a probe for decoding binary values stored on a magnetic memory comprising ferromagnetic wires.

Still a further object is to provide a readout device for decoding the binary value stored on a ferromagnetic wire by detecting the direction of propagation of a magnetic domain wall along the wires.

These and other objects and features of the invention will become more apparent from the following detailed description of the invention in conjunction with the accompanying drawings.

DESCRIPTION OF THE INVENTION

Figure 1:
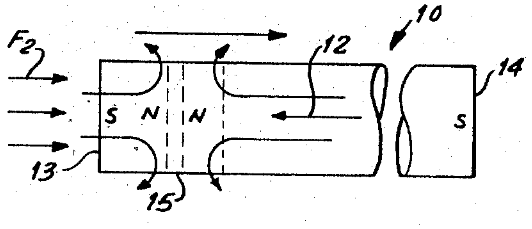
FIG. 1 shows a ferromagnetic wire nucleating a pulse at its left end.
Figure 2:
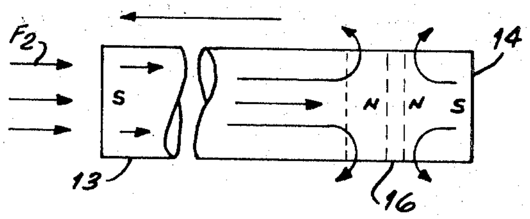
FIG. 2 shows a ferromagnetic wire nucleating a pulse at its right end.

Referring to FIGS. 1 and 2, there is shown a piece of ferromagnetic wire 10 which requires a greater magnetic force for nucleating a magnetic domain wall and a lower force for propagating the domain wall through the length of wire. One end of the wire is more affected by the magnetic force because it has a lower reluctance than the rest of the wire or it is shorter than the other end. As is shown, the left end 13 in FIG. 1 and the right end 14 in FIG. 2 is the easily affected end. The wire 10 is initially placed in a first magnetic field F, which magnetizes the wire such that the end 13 is a magnetic South and end 14 is a magnetic North with lines of flux 12 passing therethrough. Subsequently, when placed in an opposing magnetic field $F_2$, of sufficient strength, a magnetic domain wall will nucleate and propagate along the length such as 0.16 to 25 oersteads of the wire. In FIG. 1 the domain wall 15 nucleates at the end 13 and propagates to end 14, in the direction of travel as indicated. In FIG. 2, the magnetic domain wall 16 nucleates at end 14 and propagates to end 13 in the direction of travel as indicated. The direction of travel is indicative of the binary value. For example, establishing the direction of travel from left to right as a binary zero, and the direction of travel from right to left as a binary one, the wire in FIG. 1 represents a binary zero, and the wire of FIG. 2 represents a binary one. The particular binary value to be read out is preset by selecting the easily affected end by reducing its reluctance or by shortening it.

In order to sense the binary value preset onto the ferromagnetic wire, a unique readout system is required. The theory of operation of the readout system of the present invention can be explained in conjunction with FIG. 3. A first magnetic source 17 and a second magnetic source 18 shown as two bar magnets, are located to produce opposing fields of force. As shown, bar magnet 17 has its right end a magnetic North and its left end a magnetic South, while bar magnet 18 is placed in reverse direction. The lines of flux 19, 20 are shown to be flowing in opposite directions. The bar magnets are spaced apart such that a point, 21, exists wherein the two magnetic fields result in a net magnetic force of approximately zero oersteds.

An inductive pickup coil shown generally at 22 typically comprises a magnetic core 23 having a base section 24 and three arms 25, 26, 27 extending therefrom. The central arm 26 is common to a magnetic path including arm 25, base 24 and arm 26. The path is cut by a gap 28 of approximately 0.010. Similarly, arm 26 is common to a magnetic path including arm 27, base 23 and arm 26. This path is similarly cut by a gap 29 of approximately 0.010. Center arm 26 has a winding on it 30 which is energized from a source (not shown). Arm 25 has a winding on it 31 and arm 27 contains a winding 32. Windings 31 and 32 both are connected to an electronic logic decoding circuit 33. The inductive pickup device 22 in effect is a double head pickup unit. As a magnetic domain wall passes across gap 29 an electric pulse will be induced into inductive coil 32. As a magnetic domain wall passes gap 28, an electric pulse will be induced into inductive coil 31. A magnetic domain wall traveling across the entire pickup unit 22 will induce electric pulses in both coils 31 and 32. However, the sequence of pulses induced will be dependent upon the direction of travel. A domain wall traveling from right to left will first induce a pulse in coil 32, followed by a pulse in coil 31. A magnetic pulse passing in the opposite direction will first induce an electric pulse in coil 31 followed by a pulse in coil 32. Logic circuitry 33 is so arranged as to direct the sequence of occurrences of electric pulses and decode these into a binary 0 or binary 1. For example, the sequence of pulses from 32, followed by pulses from 31, may represent a binary 1, and the sequence of electric pulses from 31 followed by pulses from 32 may represent a binary 0.

Figure 3:
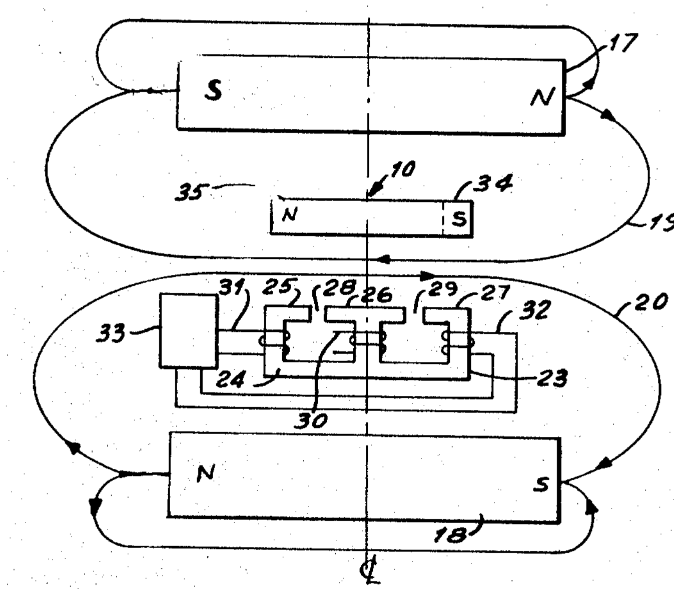
FIG. 3 shows the readout device in accordance with this invention.

In operating the readout device, a ferromagnetic wire 10 of the type described having one end thereof more easily affected by the magnetic field because of lower reluctance or shortened, passes through the device. As the wire passes the first bar magnet, 17, it becomes fully saturated to erase all previous memory of the wire and becomes magnetized as shown in FIG. 3 such that the left end 35 represents a magnetic North and the right end 34 represents a magnetic South. As the wire continues to pass through the magnetic field of bar magnet 17, the magnetic force of the bar magnet 17 gradually decreases with distance removed from the bar magnet until a point 21 of zero oersteds is reached. The ferromagnetic wire 10 then passes into an opposite magnetic field produced by bar magnet 18. Residual magnetism contained in the ferromagnetic wire 10 from the first bar magnet 13 will oppose the new field until a point is reached within the second field, which has sufficient force to nucleate a magnetic domain wall in the ferromagnetic wire. As explained in connection with FIGS. 1 and 2, the nucleation takes place at the more easily affected end because of lower reluctance or because of its being shorter, and the magnetic domain wall will propagate down the length of the ferromagnetic wire from end 34 to end 35. As previously explained, the magnetic force required to nucleate the pulse at the more easily affected end is less than the magnetic force required to nucleate a pulse in the rest of the wire, but greater than the magnetic force required for propagating the domain wall through the length of the wire. The nucleated pulse at end 34 will therefore propagate to end 35.

As the magnetic domain wall nucleated at end 34 of the ferromagnetic wire 10, propagates down the length of the wire to end 35, the magnetic domain wall induces electric pulses into the pickup device 22. Since the more easily affected end 34 appears on the right side of the ferromagnetic wire 10, the domain wall will travel through the ferromagnetic wire from right to left. The sequence of pulses through the pickup device 22 will therefore be a first pulse on coil 32 followed by a second pulse on coil 31. Logic decoding 33 will decode the sequence in accordance with the pre-established code to interpret the sequence as a binary 1.

If the ferromagnetic wire 10 had its opposite end 35 more easily affected by the magnetic field than end 34, because of reduced reluctance or shortening, the magnetic domain wall would nucleate at end 35 and would propagate from left to right, through the ferromagnetic wire, thereby inducing a sequence of electric pulses in the pickup device 22 in opposite direction. The logic decoding 33 would interpret the sequence opposite to that previously described; i.e., a binary 0.

It is therefore seen that using the ferromagnetic wire previously described in conjunction with the readout system of this invention, it is possible to detect a binary 0 or binary 1, from the magnetic memory of ferromagnetic wires. It is to be noted that the readout is correct regardless of the direction of the magnetic flux. Therefore, bar magnet 17 and bar magnet 18 could be interchanged such that the initial magnetization of the ferromagnetic wire would be in the opposite direction from that shown in FIG. 3 and the initial magnetization in the ferromagnetic wire would be reversed. Bar magnet 18, placed in magnetic opposition to bar magnet 17, would still nucleate a pulse at end 34 and the direction of propagation would not change.

Figure 4:
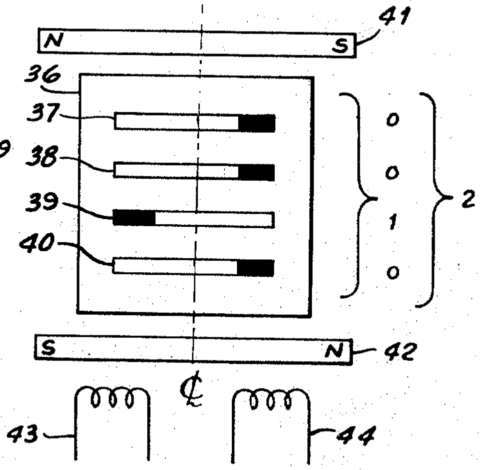
FIG. 4 shows an application of this invention for reading a binary coded decimal number.

An application of the readout device to a particular magnetic memory is shown in FIG. 4. A card 36 has four ferromagnetic wires of the type heretofore described, 37, 38, 39, 40 in which wires 37, 38 and 40 have their right ends cut off and wire 39 has its left end cut off. The predetermined code designates a pulse traveling from right to left as a binary zero and a pulse traveling from left to right as a binary one.

The card 36 containing the four ferromagnetic wires is placed in a readout device such that it passes a first magnetic source 41 whose magnetic field removes any residual magnetism and induces a magnetic state in all of the wires in a first direction. The card 42 then passes into the field of second bar magnet 42 with an opposing magnetic field. As each wire sequentially approaches closer to bar magnet 42, a point of magnetic force is reached which will be sufficient to nucleate a magnetic domain wall in the wire. The domain wall will nucleate from the cut off end and propagate to the opposite end. Coils 43, 44 are used to detect the direction of travel of the magnetic domain wall by the sequence of electric pulses induced within them. As wire 40 passes through the readout device, a binary zero will be decoded; wire 39 will be decoded into a binary one and wires 38 and 37 will both be decoded into binary zeros. The total value decoded will be 0010 which represents the decimal value 2 in the binary coded decimal system. The four wires on card 36 are sufficient to represent any decimal value in the binary coded decimal system as is known in the art. It is understood that instead of using wires encoded by cutting off one end, the ends could have been made to exhibit a reduced reluctance to the magnetic field.

Figure 5:
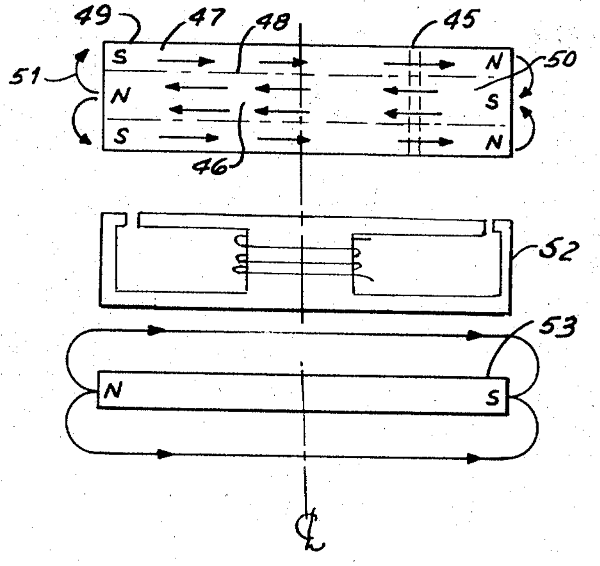
FIG. 5 shows an alternate embodiment of a readout device for use with a self-nucleating ferromagnetic wire.

Referring to FIG. 5, there is shown an alternate embodiment of the readout device for use in conjunction with ferromagnetic wires of the self-nucleating type. Ferromagnetic wire 45 represents a self-nucleating magnetic wire as described in the co-pending application No. 86,169, filed Nov. 2, 1970, now abandoned, and in continuation application No. 137,567, filed Apr. 26, 1971 now abandoned. As described in these applications, the self-nucleating ferromagnetic wire has a central core 46 of relatively soft magnetic reluctance and an outer shell 47 of relatively hard magnetic reluctance. When the self-nucleating ferromagnetic wire is placed in a magnetic field in a first direction, the entire magnetic wire will be uniformly magnetized. When the magnetic field is removed, the outer shell portion will nucleate a pulse within the inner core portion thereby reversing the magnetic field in the inner core portion and setting up a domain wall 48 between the outer shell and inner core portions of the wire. When the self-nucleating ferromagnetic wire is again placed in the same magnetic field of force as it was initially, the external magnetic field will nucleate a magnetic domain wall in the inner core portion which will propagate through the core portion resetting it back to the condition wherein the entire ferromagnetic wire is again uniformly magnetized. By making one end of the self-nucleating ferromagnetic wire more easily affected by the magnetic field by reducing its reluctance or by shortening its end, it is possible to predetermine which end will nucleate the magnetic domain wall and thereby predetermine the direction of propagation of the magnetic domain wall along the length of the wire. Using the self-nucleating ferromagnetic wire, it is possible to use a simplified readout device which only requires one magnetic source rather than the two shown in FIG. 3.

As shown in FIG. 5, the self-nucleating wire 40 was initially placed in a uniform magnetic field of sufficient force to uniformly magnetize the entire wire in a direction such that the left end 49 represents a magnetic South and the right end 50 a magnetic North. When the wire is removed from the external magnetic field, the self-nucleating properties of the ferromagnetic wire induces a reverse magnetic field in the central core portion such that the left end represents a magnetic North and the right end a magnetic South and the lines of force 51 can pass through the self-nucleating ferromagnetic wire. One end 50 of the magnetic wire is made to be more easily affected by the magnetic field by reducing its reluctance or by cutting off its end relative to the opposite end 51. The self-nucleating magnetic wire 45 is placed in the readout device having one magnetic source 53 shown as a bar magnet, wherein the magnetic field is in the same direction as the one used to initialize the magnetic field in the wire. The field from magnetic source 53 will oppose the existing magnetism in the core 46 and as the wire 45 approaches the bar magnet 53, sufficient force from the bar magnet 53 will nucleate a magnetic domain wall in the core 46. The nucleating will occur at the end 50. The nucleated magnetic domain wall will travel through the core 46 to the opposite end 49. Pick-up device 52 will detect the direction of travel of the magnetic domain wall by the sequence of pulses induced therein.

Figures 6, 7, 8:
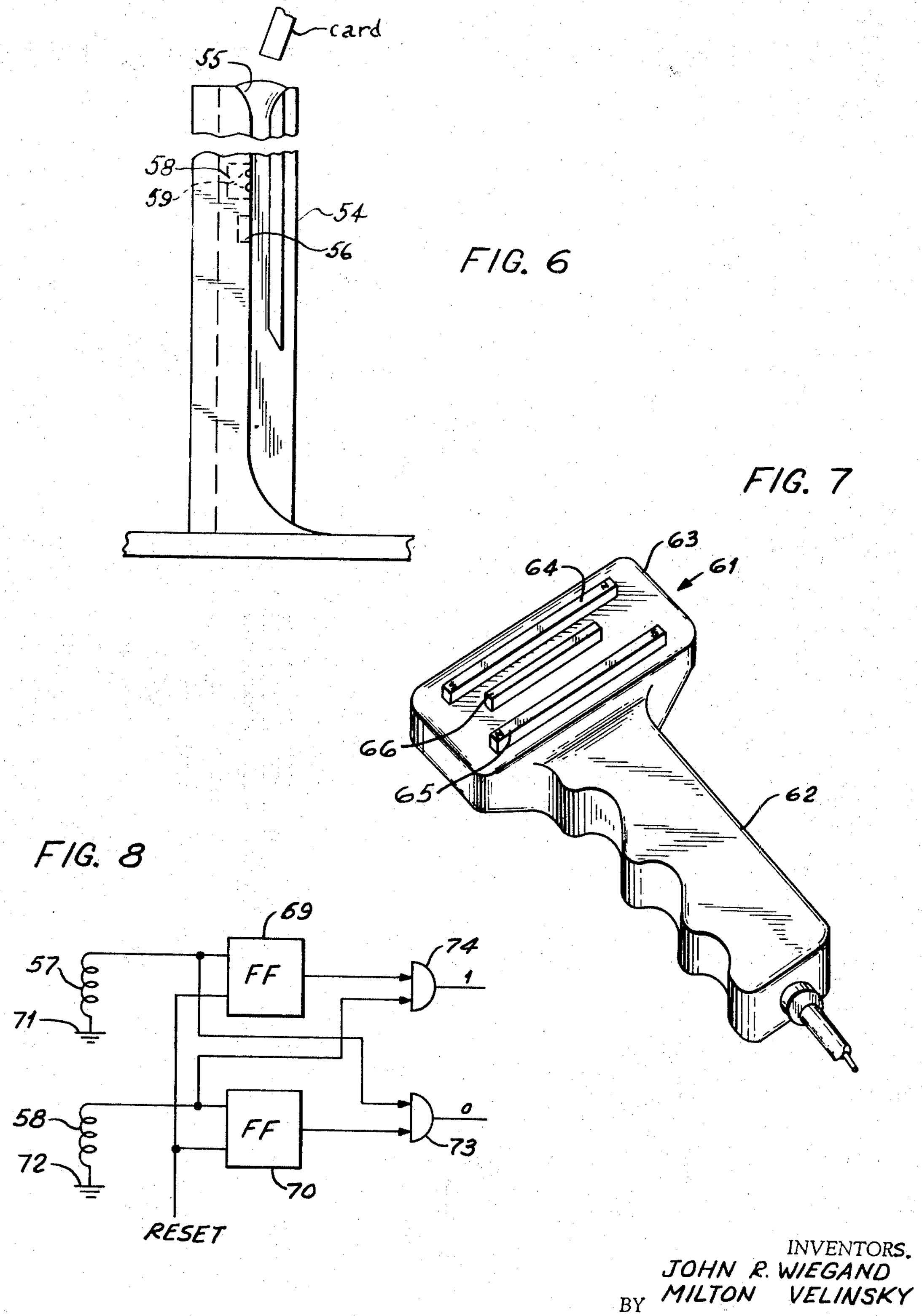
FIG. 6 shows an isometric view of a card reader in accordance with this invention.
FIG. 7 shows an isometric view of a probe readout device in accordance with this invention.
FIG. 8 shows one embodiment of a logic circuit for decoding the output from the card reader in accordance with this invention.

Referring to FIG. 6, there is shown a practical embodiment of a readout device for use with a magnetic memory formed of a plurality of ferromagnetic wires on a card. The readout device in the form of a card reader contains an en closure 54 having a top 55 in which the memory card is placed through a slot. The card reader contains a bar magnet 56. A pickup head 58 having wires 59 extending therefrom is also placed on the housing 54. The magnet and pickup head could, of course, be placed internal to the housing instead of protruding therefrom as is shown. The wires 59 can connect to an external logic circuit or alternatively the logic decoding could be contained within the housing 54 and a readout device could be connected external to the card reader. A protruding notch may be located on the interior of the enclosure to fit into a corresponding groove on the memory card thereby insuring that the card is inserted in the proper direction.

In operation, a magnetic memory card of the type described is inserted into the top slot 55 of the card reader housing 54. The magnetic wires pass the bar magnet 56 and the pickup head 58 and the direction of the magnetic domain walls which propagate through the length of the wires would be detected by the pickup head 58. The card reader of FIG. 6 could be connected to a computer where the numbers would be checked against a master list. Alternately, the card reader could be connected to a recording mechanism which would record the number for future reference. Such systems would find use in department stores where credit cards would be inserted and automatically read and detected by a central computer for authorizing purchases. This system could also be used in security systems for checking badges or identification cards.

Referring to FIG. 7, there is shown a readout device in the form of a probe 61 having a pistol grip handle 62 and a flange 63. Located on the flange 63 are bar magnets 64, 65 placed in opposing magnetic directions, and pickup device 66. Although the magnets and pickup device are shown protruding from the flange 63, they could also be located within the flange. Wires 66 extend from the handle 62 and connect to external equipment such as a recorder or a computer. The probe device as shown is useful in inventory checking where large items are to be identified. Rather than insert the memory into the readout device, the ferromagnetic wires could be attached to the inventory item in the form of a paste-on card, and the probe would be passed over it to decode the identification number.

Referring now to FIG. 8, there is shown one simplified embodiment of a logic circuit useful for decoding the direction of pulses produced in the pickup head and reading out a binary 1 or binary 0. As shown in FIG. 8, the induction coils 67, 68 are each connected respectively to a flip-flop 69 and 70. One end 71, 72 of each of the pickup coils respectively is grounded. The outputs of the pickup coils are also sent to AND gates 73, 74 respectively. The output of AND gate 74 is preestablished to represent a binary 1 and the output of AND 73 is preestablished to represent a binary 0. When a pulse is induced in coil 67, flip-flop 69 is triggered to produce an enabling signal on gate 74. The pulse from induction coil 67 will not pass through AND gate 73, since it had not been previously enabled. When a subsequent pulse appears on induction coil 68, AND gate 74 will pass the pulse, having been previously enabled. Flip-flop 70 will produce an enabling pulse for AND gate 73. However, since induction coil 67 had already sent its pulse, AND gate 73 will not produce an output. The only gate to produce a signal will be AND gate 64 which will read a binary 1. Similarly, pulses appearing in the sequence of induction coil 68 first, followed by induction coil 67, will produce an output from AND gate 73 which will be decoded as a binary 0. Following the decoding, as the card leaves the card reader, a reset pulse is triggered to reset the flip-flops. It is understood that numerous other logic circuits and decoding devices could be used to interpret the encoded signals on the magnetic memory containing the ferromagnetic wires as heretofore described.

As will be apparent to persons skilled in the art, various modifications, adaptations and variations of the foregoing specific disclosure can be made without departing from the teachings of the present invention.

What we claim as new and desire to secure by Letters Patent is:

1. A magnetic readout device for reading out information stored on a plurality of ferromagnetic wires each wire having the property of requiring a greater magnetic force for nucleating a magnetic domain wall than is required for propagating a magnetic domain wall through the wire and each wire having one end thereof more easily affected by the magnetic field than the rest of the wire thereby requiring a nucleating force less than the rest of the wire but greater than the propagating force, said readout device comprising:

a. magnetic means for nucleating a magnetic domain wall at the more easily affected end of each of said wires and for propagating said domain wall along each of said wires; and
b. sensing means for sensing the direction of propagation of said magnetic domain wall along each of said wires.

2. The device of claim 1 further including additional magnetic means for removing residual magnetism in each of said ferromagnetic wires and initializing said wires in a first magnetic state, the two magnetic means positioned to magnetically oppose each other.

3. A device as in claim 2 wherein the two magnetic means are bar magnets.

4. A device as in claim 2 wherein the two magnetic means are spaced apart from each other such that a point of zero force exists therebetween.

5. A device as in claim 1 wherein said magnetic means is placed in a direction opposing the direction of existing magnetism in said ferromagnetic wires.

6. A device as in claim 1 wherein said sensing means comprises first and second induction coils capable of having an electric pulse induced therein as said magnetic domain wall passes it.

7. A device as in claim 1 wherein said sensing means further includes a magnetic core having first and second sections each with a gap therein and including a common energizing means.

8 A device as in claim 1 wherein said sensing means includes a magnetic core having a base portion, a first and second arm extending therefrom and a common arm extending from said base and spaced between said first and second arms, a first gap between said common arm and said first arm, a second gap between said common arm and said second arm, and energizing means contained in said common arm.

9. A device as in claim 1 wherein said magnetic means has a force capable of producing a magnetic field varying in strength from 0.16 to 25 oersteds.

10. A device as in claim 1 further including a housing containing said magnetic means and said sensing means and is capable of accommodating said ferromagnetic wires passing therethrough.

11. A device as in claim 10 wherein said housing is in the form of a movable probe.

12. A device as in claim 1 wherein said sensing means further includes electronic logic means for decoding the direction of propagation of said magnetic domain wall.

13. A device as in claim 1 wherein said sensing means includes first and second induction coil means and wherein a first sequence of electric pulses is induced as said magnetic domain wall moves along said ferromagnetic wires in a first direction and a second sequence of electric pulses is induced as said magnetic domain wall moves along said ferromagnetic wires in an opposite direction.

14. A device as in claim 10 wherein said housing includes means for accepting the ferromagnetic wires in only one direction.

15. A device as in claim 1 wherein said easily affected end has a lower reluctance than the rest of the wire.

16. A device as in claim 1 wherein said easily affected end is relatively shorter than the opposite end such that the midpoint of the wire is spatially offset in an axial direction from the midpoint of the magnetic field.

17. A method of reading out information stored in a memory comprised of a plurality of ferromagnetic wires having the property of requiring a greater magnetic force for nucleating a magnetic domain wall than is required for propagating a domain wall in each of said wires, each of said wires having one end thereof more easily affectd by the magnetic field than the rest of the wire, including the steps of:

a. nucleating a magnetic domain wall in the more easily affected end in each of said wires;
b. propagating said magnetic domain wall along each of said wires;
c. sensing the direction of propagation of said magnetic domain wall along each of said wires; and
d. decoding the direction sensed.

18. The method as in claim 17 wherein said steps of nucleating and propagating includes the step of magnetizing said ferromagnetic wires in a first direction and passing said wires through a magnetic field of sufficient magnitude in an opposing direction.

19. The method as in claim 18 wherein said step of sensing further comprises the steps of inducing a sequence of electric pulses in accordance with the direction of propagation of said magnetic domain wall and detecting the sequence of pulses induced.

* * * * *

UNITED STATES PATENT OFFICE

CERTIFICATE OF CORRECTION

Patent No. 3,774,180 Dated November 20,1973

Inventor(s) JOHN R. WIEGAND

It is certified that error appears in the above-identified patent and that said Letters Patent are hereby corrected as shown below:

On the cover sheet, insert --[73] -- Assignee: Milton Velinsky, Plainfield, N.J. and John R. Wiegand, Valley Stream, New York --.

Signed and sealed this 6th of August 1974.

(SEAL)
Attest:

McCOY M. GIBSON, JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.